United States Patent
Jeon et al.

(10) Patent No.: US 11,496,277 B2
(45) Date of Patent: Nov. 8, 2022

(54) PHYSICAL RESOURCE BLOCK INDEXING FOR COEXISTENCE OF NARROW BAND, CARRIER AGGREGATION, AND WIDE BAND USER EQUIPMENT IN NEW RADIO

(71) Applicant: APPLE INC., Cupertino, CA (US)

(72) Inventors: Jeongho Jeon, San Jose, CA (US); Joonyoung Cho, Portland, OR (US); Gang Xiong, Portland, OR (US); Hong He, Sunnyvale, CA (US); Debdeep Chatterjee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/349,584

(22) PCT Filed: Jun. 15, 2018

(86) PCT No.: PCT/US2018/037734
§ 371 (c)(1),
(2) Date: May 13, 2019

(87) PCT Pub. No.: WO2018/232228
PCT Pub. Date: Dec. 20, 2018

(65) Prior Publication Data
US 2019/0280843 A1 Sep. 12, 2019

Related U.S. Application Data

(60) Provisional application No. 62/521,105, filed on Jun. 16, 2017.

(51) Int. Cl.
*H04L 5/00* (2006.01)
*H04W 72/04* (2009.01)

(52) U.S. Cl.
CPC ............ *H04L 5/0092* (2013.01); *H04L 5/001* (2013.01); *H04L 5/0053* (2013.01); *H04W 72/0453* (2013.01); *H04L 5/0044* (2013.01)

(58) Field of Classification Search
CPC ..... H04L 5/0092; H04L 5/001; H04L 5/0053; H04L 5/0044; H04W 72/0453
See application file for complete search history.

(56) References Cited

U.S. PATENT DOCUMENTS

2016/0227520 A1* 8/2016 Davydov ............ H04L 25/0228
2017/0223686 A1* 8/2017 You ........................ H04L 5/0048
(Continued)

FOREIGN PATENT DOCUMENTS

| CN | 103796314 | 5/2014 |
|---|---|---|
| EP | 3595199 | 1/2020 |

(Continued)

OTHER PUBLICATIONS

International Patent Office—International Search Report and Written Opinion dated Sep. 6, 2018 from International Application No. PCT/US2018/037734, 16 pages.
(Continued)

*Primary Examiner* — Dady Chery
(74) *Attorney, Agent, or Firm* — Fay Kaplun & Marcin, LLP

(57) ABSTRACT

Methods, systems, and storage media are described for physical resource block indexing to provide coexistence for narrow band, carrier aggregation, and wide band user equipment in new radio. Other embodiments may be described and/or claimed.

13 Claims, 13 Drawing Sheets

(56) References Cited

U.S. PATENT DOCUMENTS

2018/0183551 A1* 6/2018 Chou .................... H04L 5/0042
2020/0052939 A1* 2/2020 Xiong .................. H04L 5/0048

FOREIGN PATENT DOCUMENTS

WO      2014/098378     6/2014
WO      2017/075826     5/2017

OTHER PUBLICATIONS

Ericsson, "On Resource Allocation for UEs not Supporting the Full Carrier Bandwidth," 3GPP TSG-RAN WG1 Meeting #89, R1-1709092, Agenda Item: 7.1.3.3.1, May 15-19, 2017, Hangzhou, China, 1 page.
Huawei et al., "On Bandwidth part and bandwidth adaptation," 3GPP RAN WG1 Meeting #89, R1-1706900, Agenda Item: 7.1.7, May 15-19, 2017, Hangzhou, China, 9 pages.
PCT International Preliminary Report on Patentability in International Appln. No. PCT/US2018/037734, dated Dec. 17, 2019, 9 pages.
NEC, "Numerology indication for a mixed numerology carrier", 3GPP TSG RAN WG1 Meeting #88, R1-1701979, Feb. 6, 2017, 4 sheets.
LG Electronics, WF on PRB indexing for a UE in wider bandwidth operation, 3GPP TSG RAN1 #89, R1-1709737, May 19, 2017, 2 sheets.

* cited by examiner

420 

```
┌─────────────────────────────┐
│ Determining/defining a PRB  │
│ indexing for each of a      │
│ plurality of UEs, including │
│ determining a specific PRB  │
│ indexing for each           │
│ respective UE               │
│                             │
│            425              │
└─────────────────────────────┘
              ↓
┌─────────────────────────────┐
│ Generating signal to inform │
│ the plurality of UEs with a │
│ respective start of the PRB │
│ indexing for each           │
│ respective UE               │
│            430              │
└─────────────────────────────┘
              ↓
┌─────────────────────────────┐
│ Transmitting the signals to │
│ the plurality of UEs        │
│            435              │
│                             │
└─────────────────────────────┘
```

FIG. 4B

440 

```
┌─────────────────────────────────┐
│ Determining/defining a first PRB │
│ indexing for system BW of a NR   │
│ carrier, where the first PRB     │
│ indexing is common to a          │
│ plurality of UEs                 │
│              445                 │
└─────────────────────────────────┘
              │
              ▼
┌─────────────────────────────────┐
│ Determining/defining a second    │
│ PRB indexing for each of the     │
│ plurality of UEs, including      │
│ determining a specific PRB       │
│ indexing for each respective UE  │
│              450                 │
└─────────────────────────────────┘
              │
              ▼
┌─────────────────────────────────┐
│ Generating signals to transmit   │
│ to the plurality of UEs.         │
│              455                 │
└─────────────────────────────────┘
              │
              ▼
┌─────────────────────────────────┐
│ Transmit the signals to the      │
│ plurality of UEs                 │
│              460                 │
└─────────────────────────────────┘
```

FIG. 4C

PHYSICAL RESOURCE BLOCK INDEXING FOR COEXISTENCE OF NARROW BAND, CARRIER AGGREGATION, AND WIDE BAND USER EQUIPMENT IN NEW RADIO

RELATED APPLICATION

The present application is a national phase entry under 35 U.S.C. § 371 of International Application No. PCT/US2018/037734, filed Jun. 15, 2018, entitled "PHYSICAL RESOURCE BLOCK INDEXING FOR COEXISTENCE OF NARROW BAND, CARRIER AGGREGATION, AND WIDE BAND USER EQUIPMENT IN NEW RADIO," which claims priority under 35 U.S.C. § 119 to U.S. Provisional Application No. 62/521,105 filed Jun. 16, 2017, the contents of which are hereby incorporated by reference in their entireties.

FIELD

Various embodiments of the present application generally relate to the field of wireless communications, and in particular, to physical resource block indexing.

BACKGROUND

Mobile cellular communication has evolved significantly over the course of generations. Next generation 5G wireless communication system targeted by the third generation partnership project (3GPP) new radio (NR) system seeks to provide improved performance compared to the current 4G system in a variety of aspects, including spectral efficiency, low latency, and high reliability. These multi-dimensional goals are driven by different services and applications, including enhanced mobile broadband (eMBB), and ultra-reliability low-latency (URLLC).

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 4A, 4B, and 4C illustrate examples of operation flow/algorithmic structures in accordance with some embodiments.

DETAILED DESCRIPTION

Figure 1:
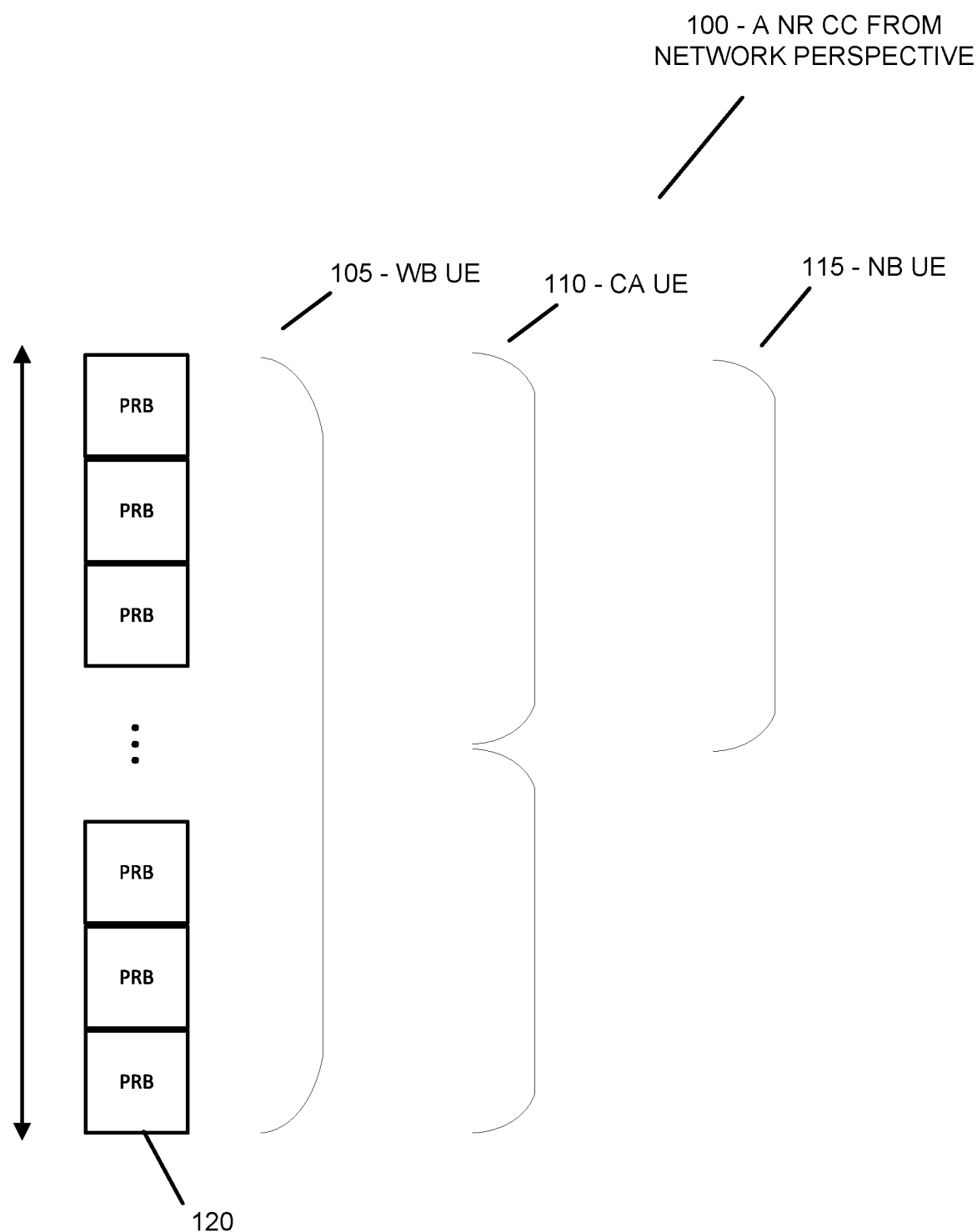
FIG. 1 illustrates an example of co-existence between different user equipments (UEs) for a NR component carrier (CC) in accordance with some embodiments.

Embodiments discussed herein relate to next-generation Node-B (gNB) operating simultaneously with user equipments (UEs) having different communication capabilities. FIG. 1 depicts an example 100 of new radio (NR) component carrier (CC) from the network perspective according to various embodiments. In this example, a gNB operates simultaneously as a wideband (WB) CC with a first set of user equipments (UEs) (105—WB UE), as a set of intra-band contiguous CCs with carrier aggregation (CA) for a second set of UEs (110—CA UE), and as a narrowband (NB) CC for a third set of UEs (115—NB UE. As described in more detail below, embodiments of the present disclosure may index physical resource blocks (PRB) 120 to enable the coexistence of the WB, CA, and NB UEs. As shown in this example, the notion of CC in NR is UE-specific rather than system-specific as in long term evolution (LTE). Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like may refer to the same, or different, embodiments. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Examples of embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Examples of embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

Embodiments of the present disclosure may utilize different forms of PRB indexing to help enable communication with different UEs. In some embodiments, a system implementing the embodiments of the present disclosure may utilize a PRB grid identical for NB, CA and WB UEs, as illustrated in FIG. 1. In some embodiments, to enable NB, CA, and WB UE coexistence, a system may utilize system specific PRB indexing and/or UE-specific PRB indexing.

System-Specific Common PRB Indexing

In some embodiments, a system-specific common PRB indexing may be used, where the PRB indexing may be defined for a given system bandwidth (BW) of an NR carrier from network perspective and thereby the indexing may be common to all the UEs. In such cases, the PRB indexing can be based on some global/common reference point on the CC from the network's perspective, such as, for example, a center of the carrier, a direct current (DC) subcarrier, a synchronization signal (SS) block, or either edge of the NR carrier.

In some embodiments, the entire information of the CC from the perspective of the network (e.g., BW and center frequency) may be signaled to UEs. As described herein, information signaled to UEs may be performed by an access node, for example, a gNB, signaling information to the UEs using physical broadcast channel (PBCH), remaining minimum system information (RMSI), or any higher layer signaling (for example, radio resource control (RRC) layer signaling). The UE may be signaled on the frequency location of its CC band within the CC from the network perspective. For example, the center frequency location of UE-specific CC band may be signaled, either edge of the UE specific CC band may be signaled, or both edges of the UE specific CC band may be signaled.

The UE may be signaled on the start of its PRB index from the network perspective, as well as its number of PRBs. In some embodiments, the UE may be signaled on the start and end of its PRB index from the network perspective.

In some embodiments, system-specific common PRB indexing may be defined for a given system BW of an NR carrier from the network perspective. Thus, the indexing may be common to all the UEs regardless of whether they are WB, CA, or NB UEs. The PRB indexing can be based on some reference point on the CC from the network perspective (e.g., center of the carrier, either edge of the NR carrier, DC subcarrier, or SS block). In some embodiments, the PRB indexing can be determined in accordance with a reference numerology (e.g., a 15 KHz subcarrier spacing for sub-6 GHz carrier frequencies or 120 KHz subcarrier spacing for above 6 GHz carrier frequencies). In some embodiments, the PRB indexing can be additionally or alternatively determined in accordance with a numerology that is employed for the transmission of an SS block, a PBCH, or NR remaining minimum system information (RMSI).

In some embodiments, a physical downlink shared channel (PDSCH) common for a group of UEs in which there are NB, CA and WB UEs may be utilized. In such cases, UEs may need to be informed of the entire CC BW from the network perspective in order to know the PRB index. Therefore, the entire information of the CC from network perspective (e.g., BW and center frequency) may be signaled to UEs in PBCH or RMSI. In addition, each UE may be signaled on where it is located in the frequency range. In some embodiments, the UE may be signaled with the start and end of its PRB indices over the entire PRB indices. Alternatively, the UE can be signaled on its starting PRB index through UE-specific RRC signaling.

In some embodiments, as described in relation to FIG. 2 below, all UEs in the network may be informed of the non-overlapping bandwidth parts constituting the overall carrier bandwidth via minimum system information (MSI), RMSI, or system information block (SIB) signaling. Subsequently, assignment of CC BW to different NB or WB or CA UEs can be achieved by indicating the bandwidth parts or their combinations. Note that for a WB or CA UE, the configured non-overlapping bandwidth parts may or may not be contiguous-in-frequency. Following this approach, the resource allocation and indexing of PRBs can still be system specific in nature, with a possible reduction in signaling based on a multi-stage frequency-domain resource allocation.

In some embodiments, signaling overhead for NB UEs may be reduced in various ways. For instance, consider an NB UE configured for PRBs indexed from 100-149 out of total 0-199 indexed PRBs from the network perspective. For such a UE, the index could be also defined from 0-49 from the UE perspective. The number of bits to express 0-49 will be smaller than 100-149, by removing the bits expressing constant value, e.g., 100.

UE-Specific PRB Indexing

In some embodiments, UE-specific PRB indexing may be used. In some examples, each UE has its own PRB indexing starting from 0. The indexing may be based on the UE-specific CC bandwidth, or on the UE-specific configured frequency range, which can be smaller than the UE's configured CC BW. In another embodiment, the indexing can be based on the UE's activated bandwidth parts (BWPs), which can be smaller than the UE's configured CC BW.

Similar to system specific PRB indexing, the UE-specific PRB indexing can be determined in accordance with a reference numerology or a numerology that is employed for the transmission of an SS block, PBCH, or RMSI. Alternatively, it can be determined in accordance with the numerology that is configured for the given UE. In one example, it can be based on the numerology associated with a bandwidth part. In cases where a UE is configured with multiple bandwidth parts within a system bandwidth, a common numerology may be used for PRB indexing.

In one example, the common numerology can be determined in accordance with the smallest or largest subcarrier spacing among the subcarrier spacings that are configured for the multiple bandwidth parts for a given UE.

In some embodiments, UE-specific PRB indexing may not require each UE to know the entire CC BW. Instead, a particular UE may only need to know their own PRB indexing, which may be based on the UE-specific CC BW as discussed above.

In some instances, the UE-specific PRB indexing may cause an issue if some group-common PDSCH is scheduled. In these instances, the UE-specific PRB indexing may prohibit a common signaling for scheduling common PDSCH.

In cases of wide system bandwidth where multiple SS blocks are transmitted, UEs can be informed of the presence/parameters of the SS block(s). In this case, the PRB indexing of SS block(s) can be determined based on system-specific PRB indexing.

System-Specific PRB Indexing and UE-Specific PRB Indexing

In some embodiments, both system-specific PRB indexing and UE-specific PRB indexing may be used. In some cases, for example, system-specific PRB indexing is used for group common PDSCH scheduling, while UE-specific PRB indexing is used for UE-specific PDSCH scheduling.

A UE may be signaled with a variety of different information. In some embodiments, for example, the UE may be signaled on the start of its PRB index from the network perspective. The UE may also be signaled on its number of PRBs. The UE may signaled on the start and end of its PRB index from the network perspective. In some embodiments, the scheduling information may be transmitted in downlink control information (DCI) and may indicate whether system-specific PRB indexing or UE-specific PRB indexing is used.

Each UE may be informed about its starting/ending PRB indices out of the system-specific common PRB indexing via, for example, RRC signaling. In some embodiments, prior to RRC configuration, system-specific PRB indexing may be used during random access channel (RACH) procedure. Further, in case of RRC reconfiguration, the PRB indexing may be determined based on system-specific indexing. This determination may be performed within a timing gap (e.g., N slots after RRC reconfiguration is transmitted via NR PDSCH or after physical uplink control channel (PUCCH) carrying acknowledgment (ACK) feedback for corresponding PDSCH carrying RRC reconfiguration).

The PRB indexing for control resource set (CORESET) can also be determined in accordance with a combination of system- and UE-specific PRB indexing. More specifically, prior to RRC configuration, system-specific PRB indexing can be utilized for common CORESET. Note that system-specific PRB indexing can be used with regard to configuration of CORESET for UE to monitor physical downlink control channel (PDCCH) for scheduling of RMSI, which can be indicated in the MSI or multicast channel scheduling information (MCSI). After RRC configuration, a UE may use UE-specific PRB indexing for UE-specific CORESET. For common CORESET, a UE may use UE-specific or system-specific PRB indexing after RRC configuration. As a further extension, system-specific PRB indexing may be used for monitoring of CORESET with a common search space. In one example, PRB indexing for group common PDCCH may be based on system-specific PRB indexing.

Wider Bandwidth

Figure 2:
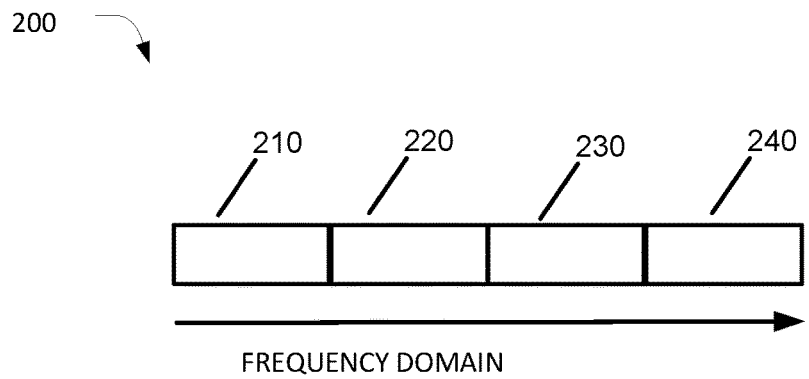
FIG. 2 illustrates an example of aggregating multiple bandwidth parts in accordance with some embodiments.

As disclosed herein and with reference to FIG. 2, the wider bandwidth 200 may be formed by aggregating multiple bandwidth parts 210, 220, 230, and 240. In some designs, the number of resource blocks (RBs) of each bandwidth part (BP) may be identical and fixed in specification. Alternatively, the number of RBs of each BP may be different and may be configured through higher layers. Physical resource blocks may be numbered from 0 to $M \cdot N_{RB}^{PB,i}-1$ in the frequency domain, where M is the number of aggregated BPs for a given UE.

In one embodiment, depending on the overall carrier bandwidth, there may be some PRBs that do not belong to any bandwidth part. Such remainder PRBs could be those at the band-edge or at the center of the carrier bandwidth. In such a case, the PRB indexing can be system-specific.

In some embodiments, resource allocation based on a scalable resource block group (RBG) size may be used to maintain the size of DCI format. In such cases, the RBG size of a wider bandwidth may be determined as a function of the number of aggregated BPs and the size of basic RBG, which may be predefined. Among other things, this approach can avoid resource wastage such as a radio access (RA) "hole" due to multiplexing UEs with different wider bandwidth allocations that are partially overlapped.

Figure 3:
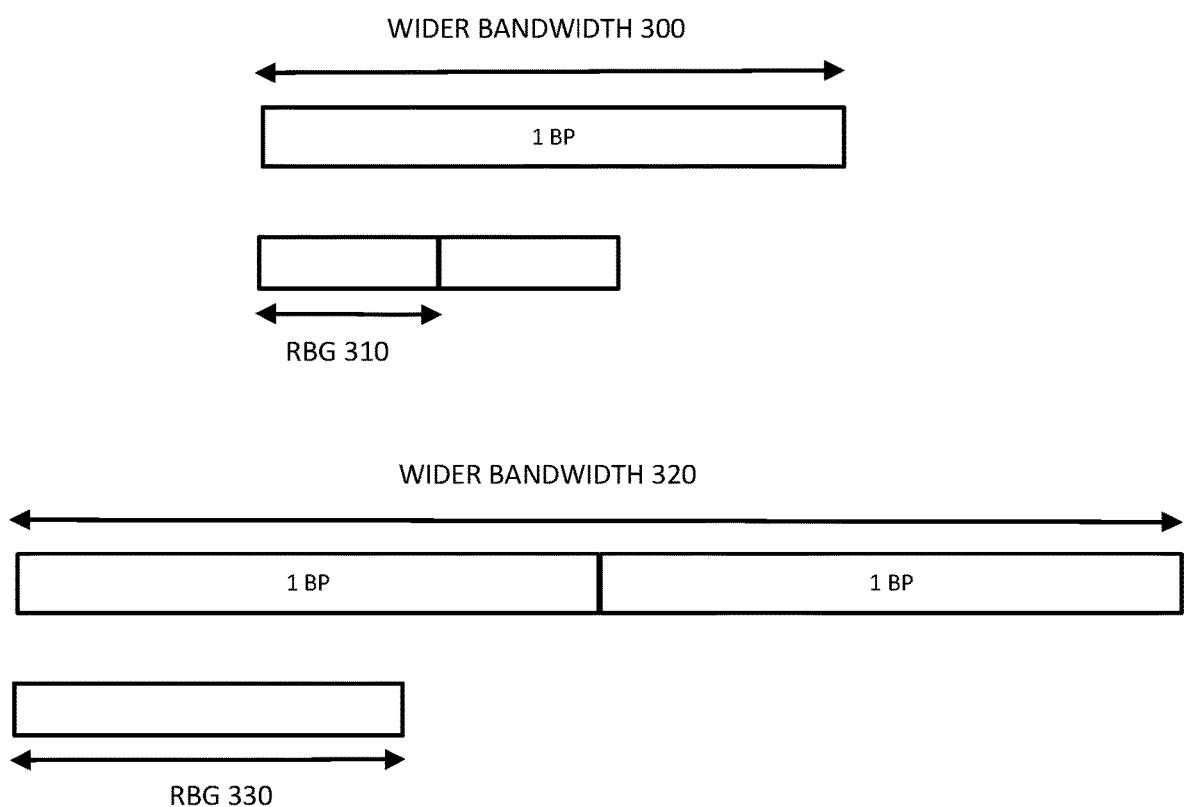
FIG. 3 illustrates an example of scalable resource block group (RGB) sizes for resource allocation in accordance with some embodiments.

In one embodiment as depicted in FIG. 3, UE1 is configured with wide bandwidth 300 and UE 2 is configured with wide bandwidth 320. As disclosed herein, assuming the basic RBG size 310 for resource allocation is P, then the size of RBG 330 is 2P and used for unit of resource allocation for UE #2 as wider bandwidth 320 is formed by aggregating 2 BPs but the wider bandwidth 300 is formed by a single BP.

Note that the above embodiments can also apply for PRB indexing for uplink (UL) transmissions. In one example, PRB indexing for PRACH and contention resolution (Msg 4) during RACH procedure can be determined in accordance with system-specific PRB indexing. After RRC configuration, it can be determined based on UE-specific PRB indexing.

In another embodiment, for UL transmissions, the PRB indexing used for resource allocation as well as for generation of any physical layer transmission parameters (e.g., reference signal parameters, etc.) may be defined in terms of CC-specific, bandwidth-part-specific, or UE-specific PRB indexing.

Figure 4A:
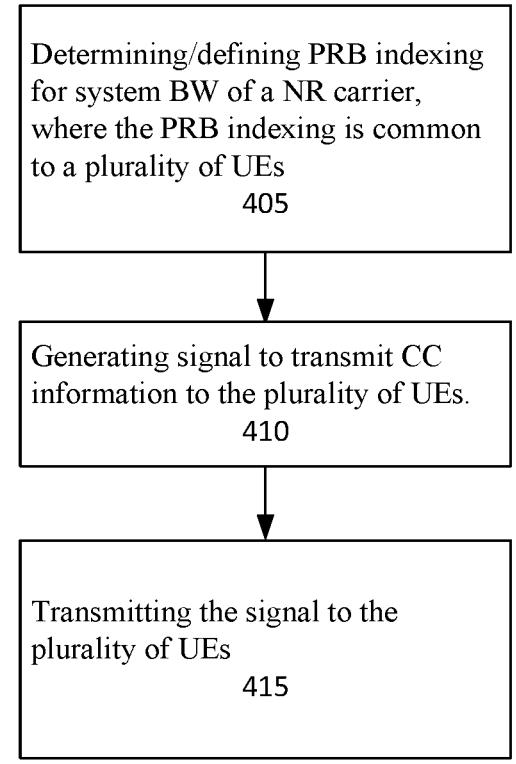

In some embodiments, the electronic device(s), network(s), system(s), chip(s) or component(s), or portions or implementations thereof, of FIGS. 5-12 herein may be configured to perform or execute one or more operation flow/algorithmic structures, processes, techniques, or methods as described herein, or portions thereof, including the operation flow/algorithmic structures illustrated in FIGS. 4A, 4B, and 4C.

One example of an operation flow/algorithmic structure is depicted in FIG. 4A, which may be performed by a gNB to provide system-specific common PRB indexing in accordance with some embodiments. In this example, operation flow/algorithmic structure 400 may include, at 405, determining/defining a PRB indexing for a system BW of an NR carrier. In some embodiments, the PRB indexing may be common to a plurality of UEs.

Operation flow/algorithmic structure 400 may further include, at 410, generating a signal to transmit CC information to the plurality of UEs. The CC information may be transmitted to the UEs to inform the UEs of the PRB indexing.

Operation flow/algorithmic structure 415 may further include, at 415, transmitting the generated signal to the plurality of UEs.

The CC information may include a variety of data. In some embodiments, for example, the CC information is to identify a bandwidth part for individual UEs of the plurality of UEs based on a common reference point of the system bandwidth. In some embodiments, the CC information may include: a starting PRB index for a respective UE of the plurality of UEs, and an ending PRB index for the respective UE.

Embodiments of the present disclosure may utilize a variety of different signals. In some embodiments, for example, the signal may be RRC signal. Embodiments of the present disclosure may cause a gNB to transmit a signal to a UE using a variety of different transmissions, including a PBCH transmission, an MSI transmission, or an RMSI transmission.

Embodiments of the present disclosure may determine PRB indexing based on a common/global reference point on the CC from the network's perspective. In some embodiments, for example, the common reference point is based on an edge of the NR carrier. In alternate embodiments, the common reference point may be based on a center of the NR carrier, a direct current (DC) subcarrier, or a synchronization signal (SS) block.

As noted previously, embodiments of the present disclosure can help a gNB use an NR CC to simultaneously communicate with a plurality of UEs having different communications capabilities. Accordingly, such a plurality of UEs may include: one or more narrowband (NB) UEs, one or more carrier aggregation (CA) UEs, and/or one or more wideband (WB) UEs.

In some embodiments, the PRB indexing may include numerology based on CC frequency. For example, the PRB indexing may be based on 15 kilohertz (kHz) subcarrier spacing for sub-6 gigahertz (GHz) carrier frequency or 120 kHz subcarrier spacing for above 6 GHz carrier frequency. The PRB indexing may be numerically indexed (e.g., starting at zero).

Another operation flow/algorithmic structure 420 is depicted in FIG. 4B, which may be performed by a gNB to provide UE-specific PRB indexing in accordance with some embodiments. In this example, operation flow/algorithmic structure 420 may include, at 425, determining/defining a PRB indexing for a system BW of an NR carrier for each of a plurality of UEs, wherein a specific PRB indexing is defined for each respective UE in the plurality of UEs.

In some embodiments, the PRB indexing for each respective UE is based on a configured frequency range specific to the respective UE. In some embodiments, the PRB indexing for each respective UE is numerically indexed starting at zero.

Operation flow/algorithmic structure 420 may further include, at 430, generating signals to inform each respective UE in the plurality of UEs with a respective start of the PRB indexing for the respective UE.

Operation flow/algorithmic structure 400 may further include, at 435, transmitting the signals to the plurality of UEs. In some embodiments, the signals comprise RRC signals.

Another operation flow/algorithmic structure 440 is depicted in FIG. 4C, which may be performed by a gNB to provide both system-specific PRB indexing and UE-specific PRB indexing in accordance with some embodiments. In this example, operation flow/algorithmic structure 440 may include, at 445, determining/defining a first PRB indexing for a system BW of an NR carrier, wherein the first PRB indexing is common to a plurality of UEs. Operation flow/algorithmic structure 440 may further include, at 450, determining/defining a second PRB indexing for the system BW of the NR carrier for each of the plurality of UEs, wherein determining the second PRB indexing includes determining a specific PRB indexing for each respective UE.

In some embodiments, the first PRB indexing is for group common PDSCH scheduling, and the second PRB indexing is for UE-specific PDSCH scheduling.

The system-specific PRB indexing and UE-specific PRB indexing for joint system-specific and UE-specific indexing may be determined based on factors described previously. For example, determining the first PRB indexing may be based on a common reference point, such as an edge of the NR carrier. In another example, the first PRB indexing may include numerology based on CC frequency.

Operation flow/algorithmic structure 440 may further include, at 455, generating signals to transmit to the plurality of UEs, and at 460, transmitting/signaling the signals to the plurality of UEs, wherein each respective UE may be signaled with a respective start of the first PRB indexing for the respective UE, and a respective start of the second PRB indexing for the respective UE.

In some embodiments, each respective UE may be signaled with a respective end of the first PRB indexing for the respective UE, and a respective end of the second PRB indexing for the respective UE. In some embodiments, each respective UE is signaled using a radio resource control (RRC) signal.

Figure 5:
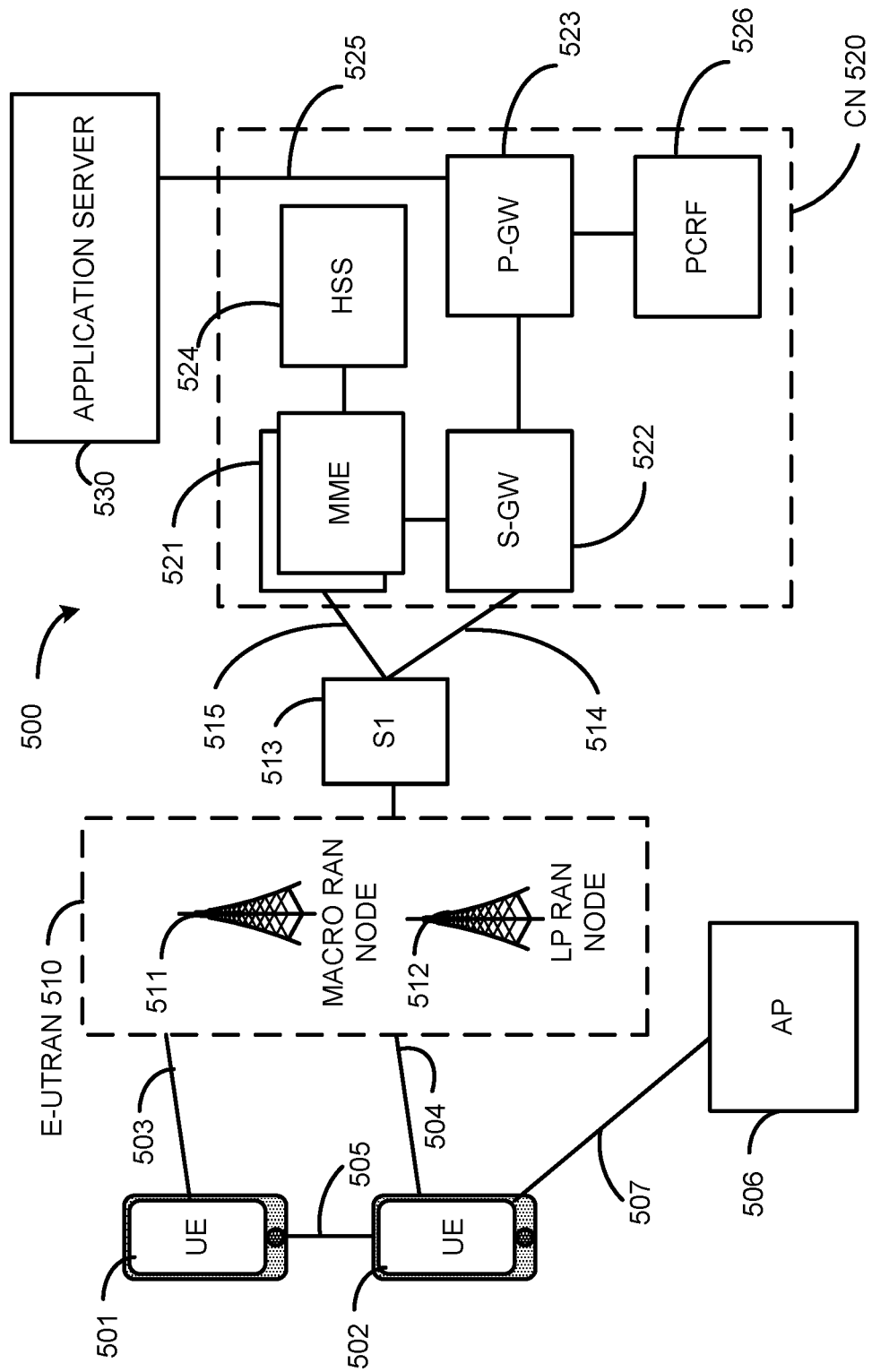
FIG. 5 depicts an architecture of a system of a network in accordance with some embodiments.

FIG. 5 illustrates an architecture of a system 500 of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management, and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 502 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment, the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMEs 521.

In this embodiment, the CN 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
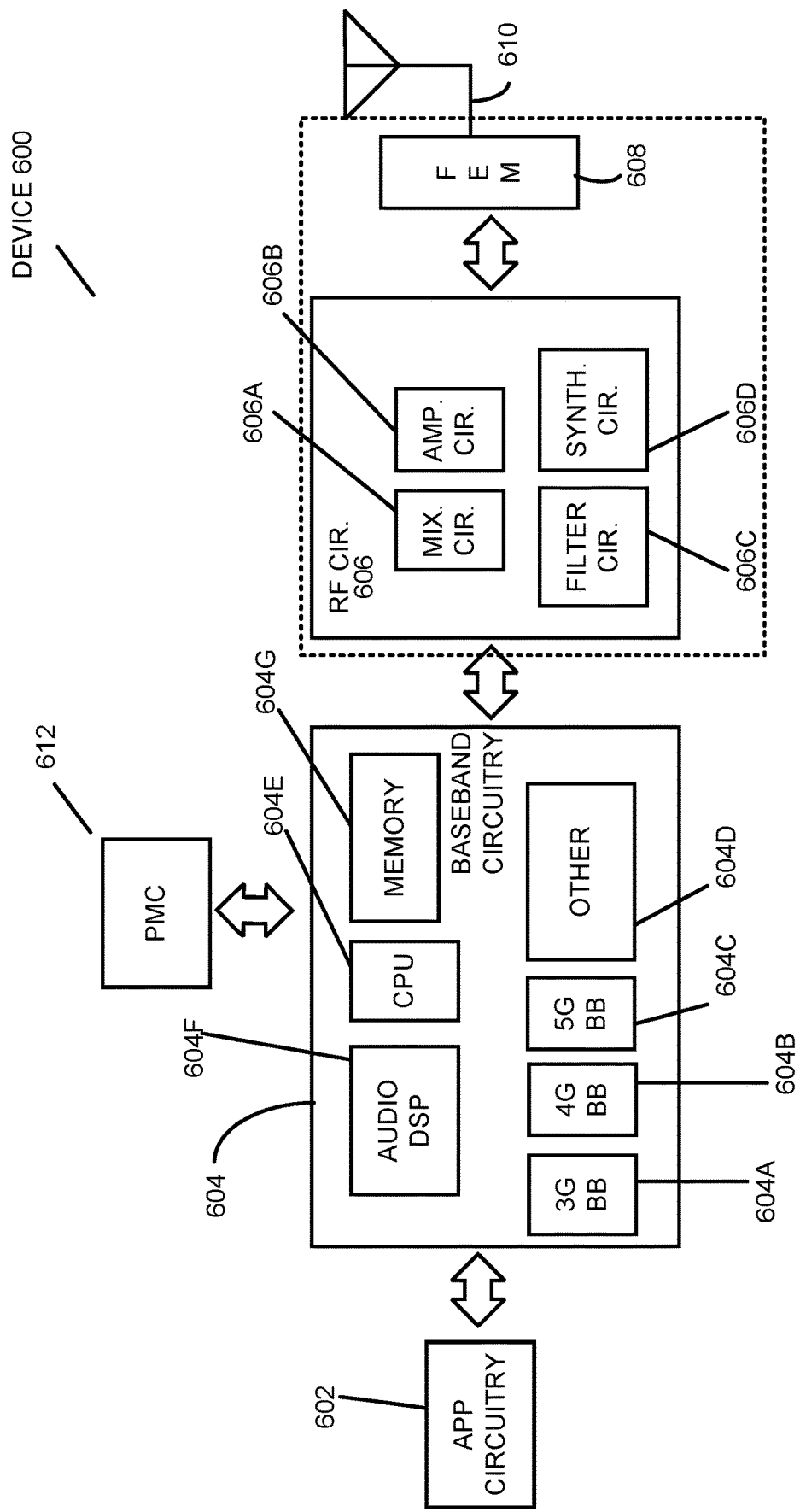
FIG. 6 depicts an example of components of a device in accordance with some embodiments.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a of the transmit signal path may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path, which may include circuitry configured to operate on RF signals received from one or more antennas 610, amplify the received signals and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include a low noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
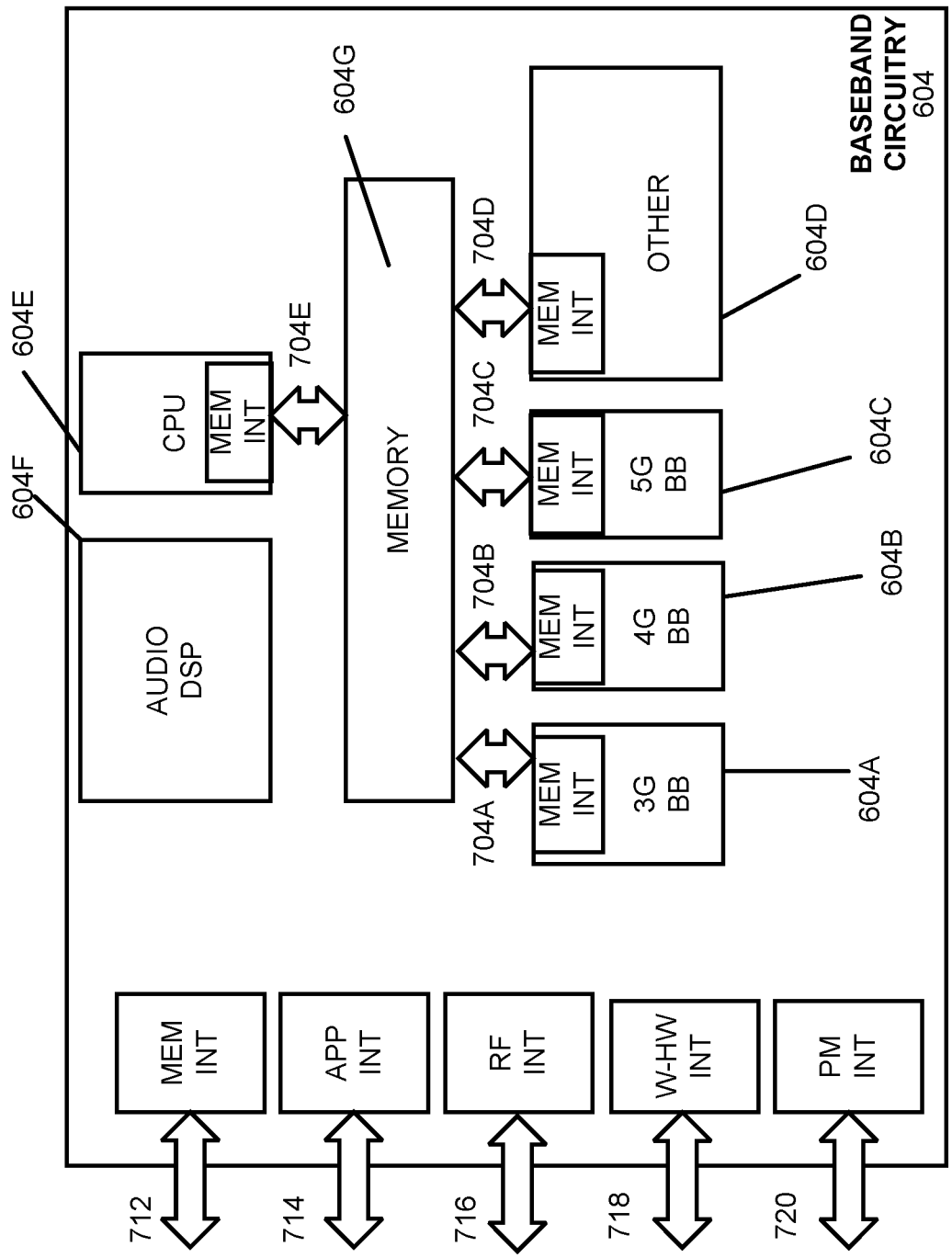
FIG. 7 depicts an example of interfaces of baseband circuitry in accordance with some embodiments.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
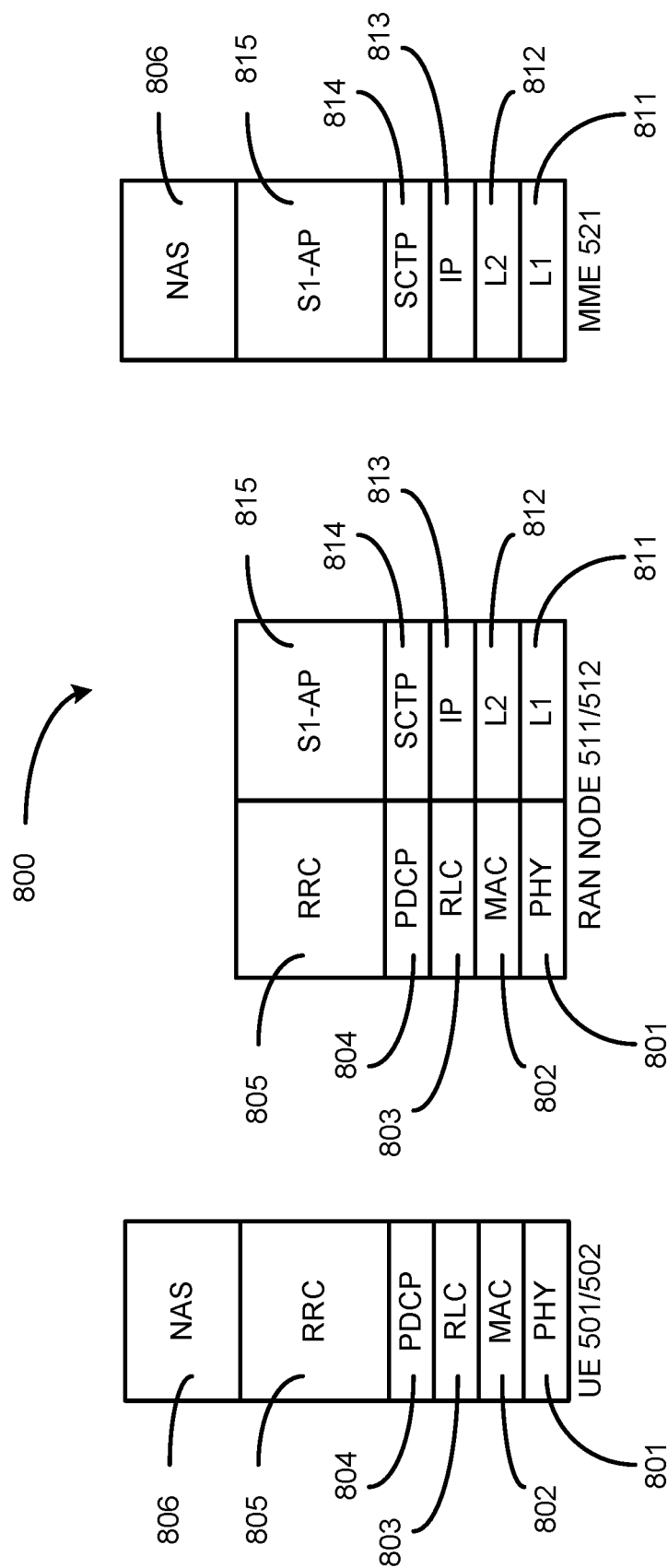
FIG. 8 is an illustration of a control plane protocol stack in accordance with some embodiments.

FIG. 8 is an illustration of a control plane protocol stack in accordance with some embodiments. In this embodiment, a control plane 800 is shown as a communications protocol stack between the UE 501 (or alternatively, the UE 502), the RAN node 511 (or alternatively, the RAN node 512), and the MME 521.

The PHY layer 801 may transmit or receive information used by the MAC layer 802 over one or more air interfaces. The PHY layer 801 may further perform link adaptation or adaptive modulation and coding (AMC), power control, cell search (e.g., for initial synchronization and handover purposes), and other measurements used by higher layers, such as the RRC layer 805. The PHY layer 801 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 802 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 803 may operate in a plurality of modes of operation, including: Transparent Mode (TM), Unacknowledged Mode (UM), and Acknowledged Mode (AM). The RLC layer 803 may execute transfer of upper layer protocol data units (PDUs), error correction through automatic repeat request (ARQ) for AM data transfers, and concatenation, segmentation and reassembly of RLC SDUs for UM and AM data transfers. The RLC layer 803 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 804 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 805 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 501 and the RAN node 511 may utilize a Uu interface (e.g., an LTE-Uu interface) to exchange control plane data via a protocol stack comprising the PHY layer 801, the MAC layer 802, the RLC layer 803, the PDCP layer 804, and the RRC layer 805.

The non-access stratum (NAS) protocols 806 form the highest stratum of the control plane between the UE 501 and the MME 521. The NAS protocols 806 support the mobility of the UE 501 and the session management procedures to establish and maintain IP connectivity between the UE 501 and the P-GW 523.

The S1 Application Protocol (S1-AP) layer 815 may support the functions of the S1 interface and comprise Elementary Procedures (EPs). An EP is a unit of interaction between the RAN node 511 and the CN 520. The S1-AP layer services may comprise two groups: UE-associated services and non-UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 814 may ensure reliable delivery of signaling messages between the RAN node 511 and the MME 521 based, in part, on the IP protocol, supported by the IP layer 813. The L2 layer 812 and the L1 layer 811 may refer to communication links (e.g., wired or wireless) used by the RAN node and the MME to exchange information.

The RAN node 511 and the MME 521 may utilize an S1-MME interface to exchange control plane data via a protocol stack comprising the L1 layer 811, the L2 layer 812, the IP layer 813, the SCTP layer 814, and the S1-AP layer 815.

Figure 9:
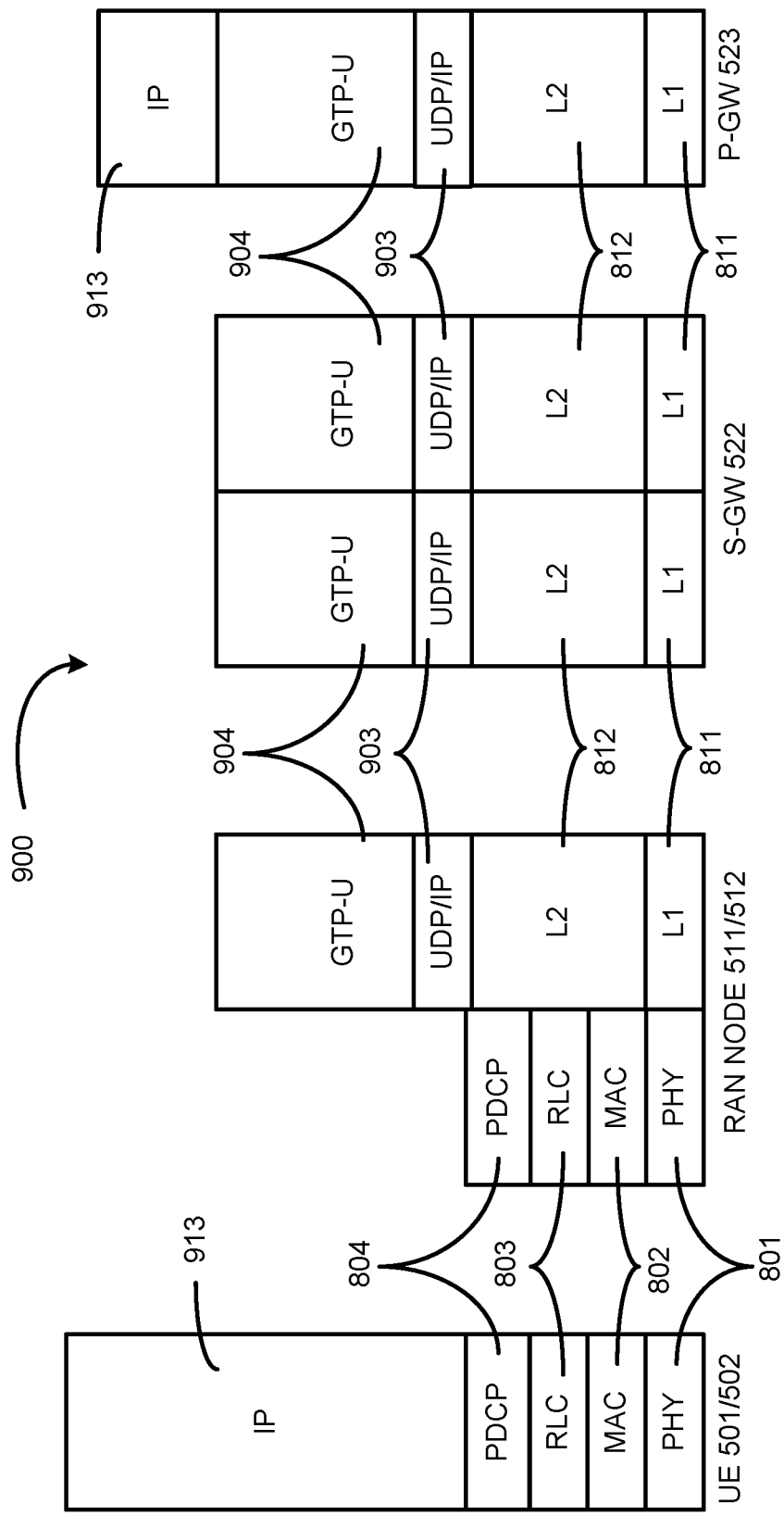
FIG. 9 is an illustration of a user plane protocol stack in accordance with some embodiments.

FIG. 9 is an illustration of a user plane protocol stack in accordance with some embodiments. In this embodiment, a user plane 900 is shown as a communications protocol stack between the UE 501 (or alternatively, the UE 502), the RAN node 511 (or alternatively, the RAN node 512), the S-GW 522, and the P-GW 523. The user plane 900 may utilize at least some of the same protocol layers as the control plane 800. For example, the UE 501 and the RAN node 511 may utilize a Uu interface (e.g., an LTE-Uu interface) to exchange user plane data via a protocol stack comprising the PHY layer 801, the MAC layer 802, the RLC layer 803, the PDCP layer 804.

The General Packet Radio Service (GPRS) Tunneling Protocol for the user plane (GTP-U) layer 904 may be used for carrying user data within the GPRS core network and between the radio access network and the core network. The user data transported can be packets in any of IPv4, IPv6, or PPP formats, for example. The UDP and IP security (UDP/IP) layer 913 may provide checksums for data integrity, port numbers for addressing different functions at the source and destination, and encryption and authentication on the selected data flows. The RAN node 511 and the S-GW 522 may utilize an S1-U interface to exchange user plane data via a protocol stack comprising the L1 layer 811, the L2 layer 812, the UDP/IP layer 913, and the GTP-U layer 904. The S-GW 522 and the P-GW 523 may utilize an S5/S8a interface to exchange user plane data via a protocol stack comprising the L1 layer 811, the L2 layer 812, the UDP/IP layer 913, and the GTP-U layer 904. As discussed above with respect to FIG. 8, NAS protocols support the mobility of the UE 501 and the session management procedures to establish and maintain IP connectivity between the UE 501 and the P-GW 523.

Figure 10:
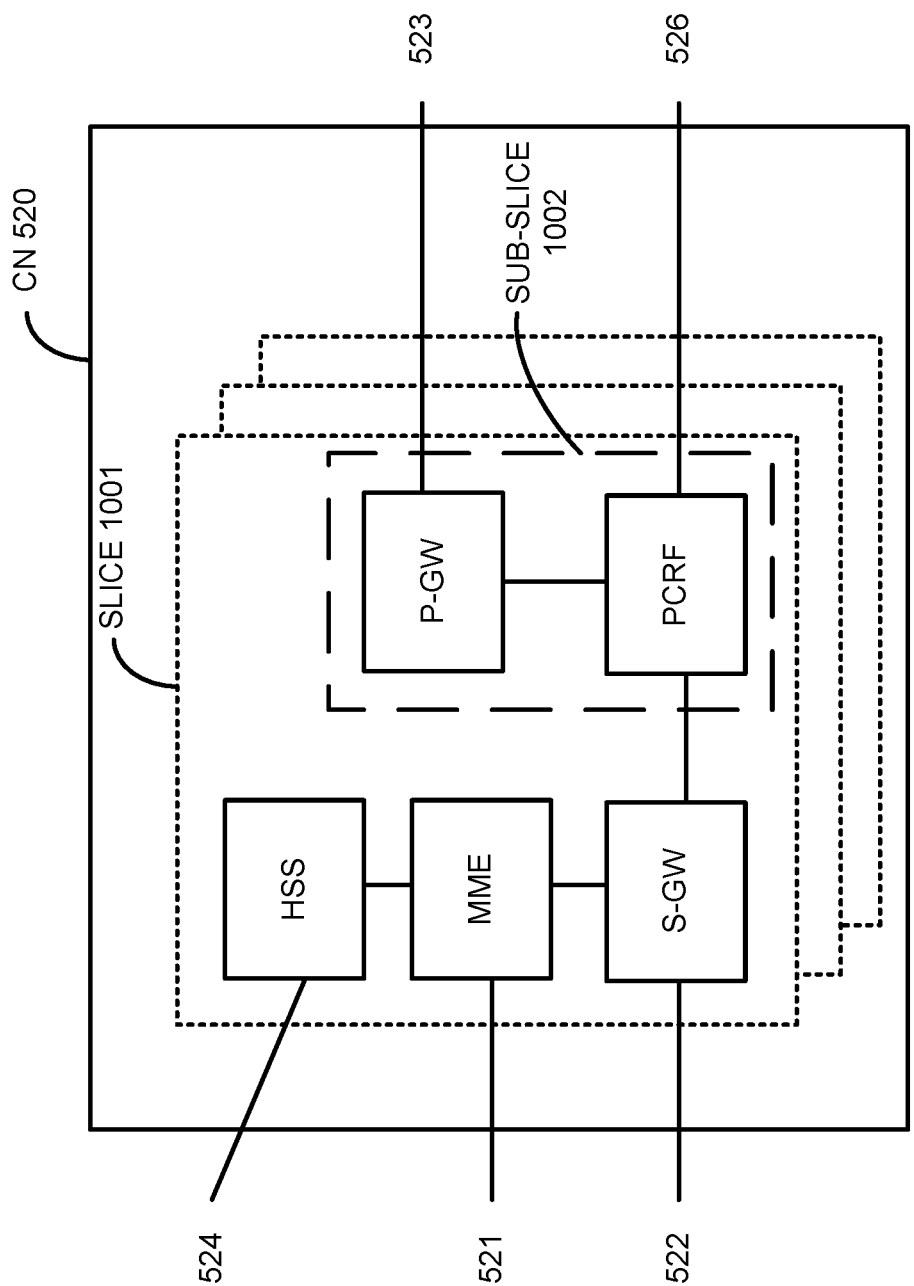
FIG. 10 illustrates components of a core network in accordance with some embodiments.

FIG. 10 illustrates components of a core network in accordance with some embodiments. The components of the CN 520 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 520 may be referred to as a network slice 1001. A logical instantiation of a portion of the CN 520 may be referred to as a network sub-slice 1002 (e.g., the network sub-slice 1002 is shown to include the PGW 523 and the PCRF 526).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 11:
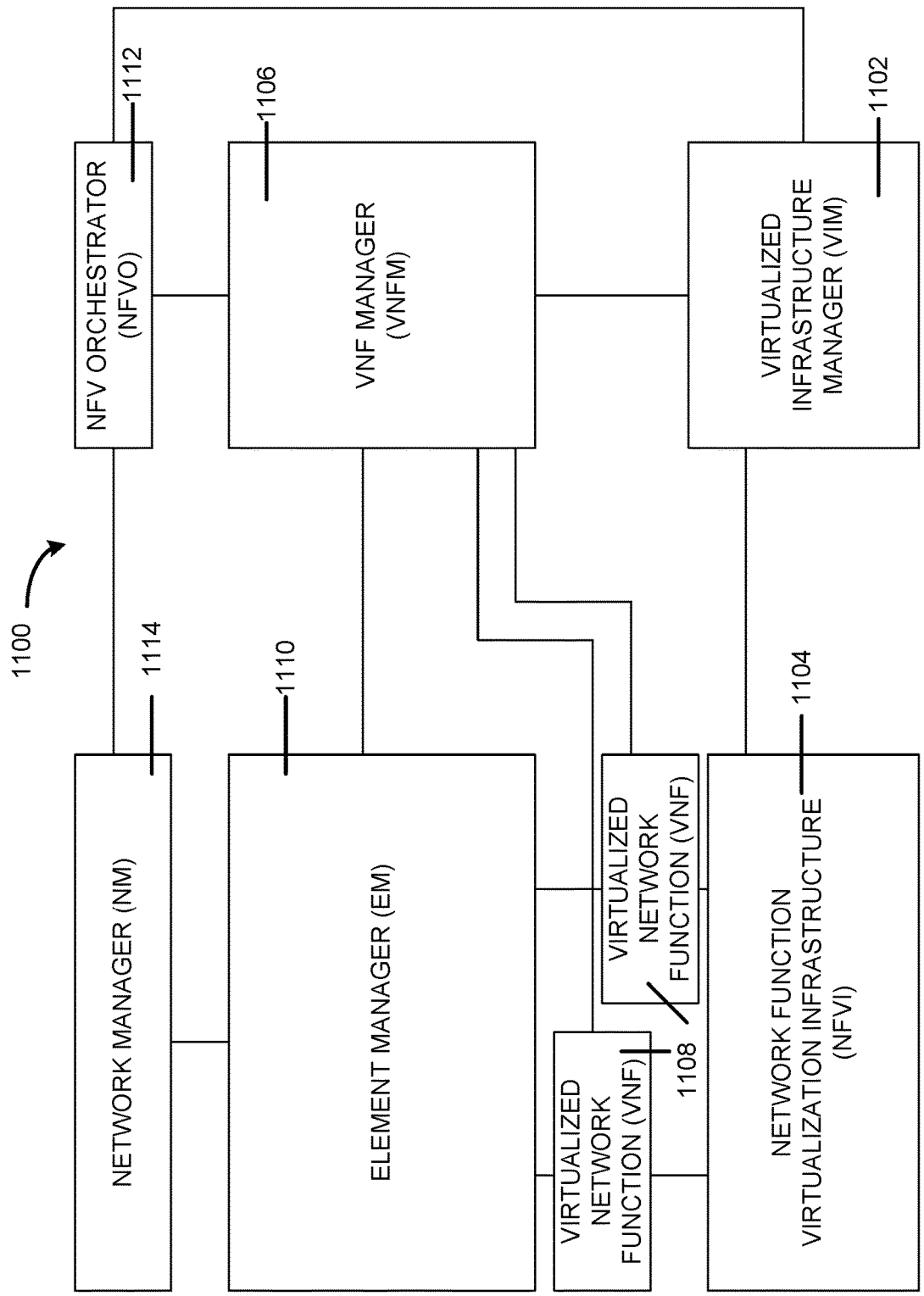
FIG. 11 is a block diagram illustrating components, according to some embodiments, of a system to support network function virtualization (NFV).

FIG. 11 is a block diagram illustrating components, according to some example embodiments, of a system 1100 to support NFV. The system 1100 is illustrated as including a virtualized infrastructure manager (VIM) 1102, a network function virtualization infrastructure (NFVI) 1104, a VNF manager (VNFM) 1106, virtualized network functions (VNFs) 1108, an element manager (EM) 1110, an NFV Orchestrator (NFVO) 1112, and a network manager (NM) 1114.

The VIM 1102 manages the resources of the NFVI 1104. The NFVI 1104 can include physical or virtual resources and applications (including hypervisors) used to execute the system 1100. The VIM 1102 may manage the life cycle of virtual resources with the NFVI 1104 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1106 may manage the VNFs 1108. The VNFs 1108 may be used to execute EPC components/functions. The VNFM 1106 may manage the life cycle of the VNFs 1108 and track performance, fault and security of the virtual aspects of VNFs 1108. The EM 1110 may track the performance, fault and security of the functional aspects of VNFs 1108. The tracking data from the VNFM 1106 and the EM 1110 may comprise, for example, performance measurement (PM) data used by the VIM 1102 or the NFVI 1104. Both the VNFM 1106 and the EM 1110 can scale up/down the quantity of VNFs of the system 1100.

The NFVO 1112 may coordinate, authorize, release and engage resources of the NFVI 1104 in order to provide the requested service (e.g., to execute an EPC function, component, or slice). The NM 1114 may provide a package of end-user functions with the responsibility for the management of a network, which may include network elements with VNFs, non-virtualized network functions, or both (management of the VNFs may occur via the EM 1110).

Figure 12:
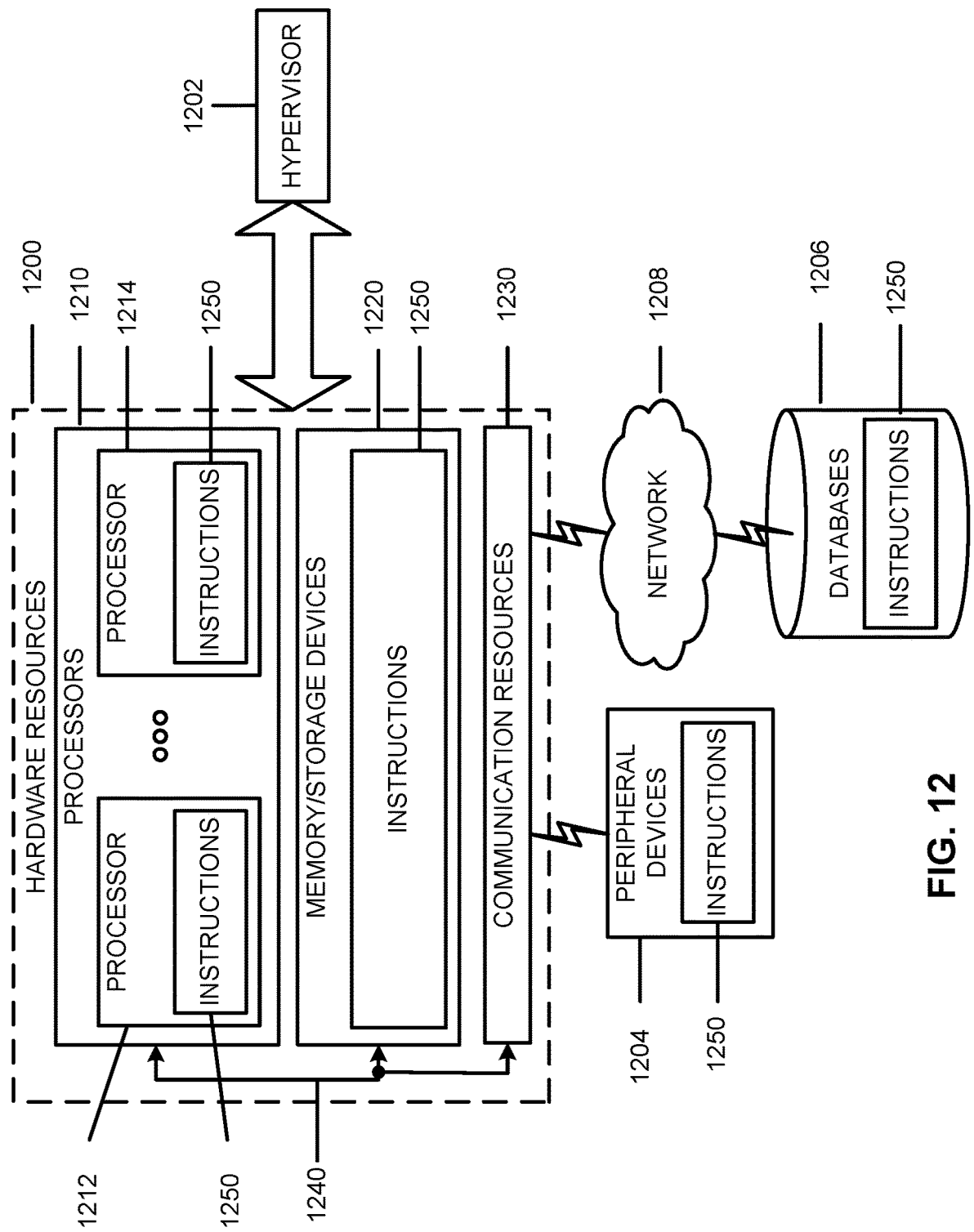
FIG. 12 depicts a block diagram illustrating components, according to some embodiments, able to read instructions from a machine-readable or computer-readable medium (e.g., a non-transitory machine-readable storage medium) and perform any one or more of the methodologies discussed herein.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200.

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1212 and a processor 1214.

The memory/storage devices 1220 may include main memory, disk storage, or any suitable combination thereof. The memory/storage devices 1220 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

In various embodiments, the devices/components of FIGS. 5, 6, 8, 9, 10, 11, 12, and particularly the baseband circuitry of FIG. 7, may be used to: determine/define a PRB indexing for a system BW of a NR carrier; generate a signal to inform a plurality of UEs of the PRB indexing; and transmit the signal to the plurality of user equipments (UEs).

EXAMPLES

Some non-limiting examples are provided below.

Example 1 includes one or more computer-readable media storing instructions, that, when executed by one or more processors, cause a next-generation Node-B (gNB) to: determine a physical resource block (PRB) indexing for a system bandwidth (BW) of a new radio (NR) carrier, wherein the PRB indexing is common to a plurality of user equipments (UEs); and generate a signal to transmit component carrier (CC) information to the plurality of UEs, the CC information to inform the plurality of UEs of the PRB indexing.

Example 2 includes the one or more computer-readable media of example 1 or some other example herein, wherein the CC information is to identify a bandwidth part for individual UEs of the plurality of UEs based on a common reference point of the system bandwidth.

Example 3 includes the one or more computer-readable media of example 1 or some other example herein, wherein the CC information includes: a starting PRB index for a respective UE of the plurality of UEs, and an ending PRB index for the respective UE.

Example 4 includes the one or more computer-readable media of example 1 or some other example herein, wherein the signal is a radio resource control (RRC) signal.

Example 5 includes the one or more computer-readable media of example 1 or some other example herein, wherein the instructions, when executed, further cause the gNB to cause the signal to be transmitted using a physical broadcast channel (PBCH) transmission, a minimum system information (MSI) transmission, or a remaining minimum system information (RMSI) transmission.

Example 6 includes the one or more computer-readable media of example 1 or some other example herein, wherein the gNB is to determine the PRB indexing based on a common reference point.

Example 7 includes the one or more computer-readable media of example 6 or some other example herein, wherein the common reference point is based on an edge of the NR carrier.

Example 8 includes the one or more computer-readable media of example 6 or some other example herein, wherein the common reference point is based on a center of the NR carrier, a direct current (DC) subcarrier, or a synchronization signal (SS) block.

Example 9 includes the one or more computer-readable media of example 1 or some other example herein, wherein the plurality of UEs include a narrowband (NB) UE, a carrier aggregation (CA) UE, and a wideband (WB) UE.

Example 10 includes the one or more computer-readable media of example 1 or some other example herein, wherein the PRB indexing includes numerology based on CC frequency.

Example 11 includes the one or more computer-readable media of example 1 or some other example herein, wherein the PRB indexing is based on a 15-kilohertz (kHZ) subcarrier spacing for sub-6 gigahertz (GHz) carrier frequencies.

Example 12 includes the one or more computer-readable media of example 1 or some other example herein, wherein the PRB indexing is numerically indexed starting at zero.

Example 13 includes one or more computer-readable media storing instructions, that, when executed by one or more processors, cause a next-generation Node-B (gNB) to: define a physical resource block (PRB) indexing for a system bandwidth (BW) of a new radio (NR) carrier for each of a plurality of user equipments (UEs), wherein a specific PRB indexing is defined for each respective UE; and generate signals to inform each respective UE of the plurality of UEs with a respective start of the PRB indexing for the respective UE.

Example 14 includes the one or more computer-readable media of example 13 or some other example herein, wherein the PRB indexing for each respective UE is based on a configured frequency range specific to the respective UE.

Example 15 includes the one or more computer-readable media of example 13 or some other example herein, wherein the PRB indexing for each respective UE is numerically indexed starting at zero.

Example 16 includes the one or more computer-readable media of example 13 or some other example herein, wherein the signals comprise radio resource control (RRC) signals.

Example 17 includes one or more computer-readable media storing instructions, that, when executed by one or more processors, cause a next-generation Node-B (gNB) to: determine a first physical resource block (PRB) indexing for a system bandwidth (BW) of a new radio (NR) carrier, wherein the first PRB indexing is common to a plurality of user equipments (UEs); determine a second PRB indexing for the system BW of the NR carrier for each of the plurality of UEs, wherein determining the second PRB indexing includes determining a specific PRB indexing for each respective UE; and signal each respective UE from the plurality of UEs with: a respective start of the first PRB indexing for the respective UE, and a respective start of the second PRB indexing for the respective UE.

Example 18 includes the one or more computer-readable media of example 17 or some other example herein, wherein the first PRB indexing is for group common physical downlink shared channel (PDSCH) scheduling, and wherein the second PRB indexing is for UE-specific PDSCH scheduling.

Example 19 includes the one or more computer-readable media of example 17 or some other example herein, wherein each respective UE is signaled with: a respective end of the first PRB indexing for the respective UE, and a respective end of the second PRB indexing for the respective UE.

Example 20 includes the one or more computer-readable media of example 17 or some other example herein, wherein the each respective UE is signaled using a radio resource control (RRC) signal.

Example 21 includes the one or more computer-readable media of example 17 or some other example herein, wherein determining the first PRB indexing is based on a common reference point.

Example 22 includes the one or more computer-readable media of example 21 or some other example herein, wherein the common reference point is based on an edge of the NR carrier.

Example 23 includes the one or more computer-readable media of example 17 or some other example herein, wherein the first PRB indexing includes numerology based on CC frequency.

Example 24 includes an apparatus comprising: memory to store component carrier (CC) information; and processing circuitry, coupled to the memory, to: determine a physical resource block (PRB) indexing for a system bandwidth (BW) of a new radio (NR) carrier, wherein the PRB indexing is common to a plurality of user equipments (UEs); and generate a signal to transmit the CC information to the plurality of UEs, the CC information to inform the plurality of UEs of the PRB indexing.

Example 25 includes the apparatus of example 24, wherein the signal is a resource control (RRC) signal.

Example 26 includes a method comprising determining a physical resource block (PRB) indexing for a system bandwidth (BW) of a new radio (NR) carrier, wherein the PRB indexing is common to a plurality of user equipments (UEs); and generating a signal to transmit component carrier (CC) information to the plurality of UEs, the CC information to inform the plurality of UEs of the PRB indexing.

Example 27 includes the method of example 26 or some other example herein, wherein the CC information is to identify a bandwidth part for individual UEs of the plurality of UEs based on a common reference point of the system bandwidth.

Example 28 includes the method of example 26 or some other example herein, wherein the CC information includes: a starting PRB index for a respective UE of the plurality of UEs, and an ending PRB index for the respective UE.

Example 29 includes the method of example 26 or some other example herein, wherein the signal is a radio resource control (RRC) signal.

Example 30 includes the method of example 26 or some other example herein, wherein the instructions, when executed, further cause the gNB to cause the signal to be transmitted using a physical broadcast channel (PBCH) transmission, a minimum system information (MSI) transmission, or a remaining minimum system information (RMSI) transmission.

Example 31 includes the method of example 26 or some other example herein, wherein the gNB is to determine the PRB indexing based on a common reference point.

Example 32 includes the method of example 31 or some other example herein, wherein the common reference point is based on an edge of the NR carrier.

Example 33 includes the method of example 31 or some other example herein, wherein the common reference point is based on a center of the NR carrier, a direct current (DC) subcarrier, or a synchronization signal (SS) block.

Example 34 includes the method of example 26 or some other example herein, wherein the plurality of UEs include a narrowband (NB) UE, a carrier aggregation (CA) UE, and a wideband (WB) UE.

Example 35 includes the method of example 26 or some other example herein, wherein the PRB indexing includes numerology based on CC frequency.

Example 36 includes the method of example 26 or some other example herein, wherein the PRB indexing is based on a 15-kilohertz (kHZ) subcarrier spacing for sub-6 gigahertz (GHz) carrier frequencies.

Example 37 includes the method of example 26 or some other example herein, wherein the PRB indexing is numerically indexed starting at zero.

Example 38 includes a method comprising: defining a physical resource block (PRB) indexing for a system bandwidth (BW) of a new radio (NR) carrier for each of a plurality of user equipments (UEs), wherein a specific PRB indexing is defined for each respective UE; and generating signals to inform each respective UE of the plurality of UEs with a respective start of the PRB indexing for the respective UE.

Example 39 includes the method of example 38 or some other example herein, wherein the PRB indexing for each respective UE is based on a configured frequency range specific to the respective UE.

Example 40 includes the method of example 38 or some other example herein, wherein the PRB indexing for each respective UE is numerically indexed starting at zero.

Example 41 includes the method of example 38 or some other example herein, wherein the signals comprise radio resource control (RRC) signals.

Example 42 includes a method comprising: determining a first physical resource block (PRB) indexing for a system bandwidth (BW) of a new radio (NR) carrier, wherein the first PRB indexing is common to a plurality of user equipments (UEs); determining a second PRB indexing for the system BW of the NR carrier for each of the plurality of UEs, wherein determining the second PRB indexing includes determining a specific PRB indexing for each respective UE; and signaling each respective UE from the plurality of UEs with: a respective start of the first PRB indexing for the respective UE, and a respective start of the second PRB indexing for the respective UE.

Example 43 includes the method of example 42 or some other example herein, wherein the first PRB indexing is for group common physical downlink shared channel (PDSCH) scheduling, and wherein the second PRB indexing is for UE-specific PDSCH scheduling.

Example 44 includes the method of example 42 or some other example herein, wherein each respective UE is signaled with: a respective end of the first PRB indexing for the respective UE, and a respective end of the second PRB indexing for the respective UE.

Example 45 includes the method of example 42 or some other example herein, wherein the each respective UE is signaled using a radio resource control (RRC) signal.

Example 46 includes the method of example 42 or some other example herein, wherein determining the first PRB indexing is based on a common reference point.

Example 47 includes the method of example 46 or some other example herein, wherein the common reference point is based on an edge of the NR carrier.

Example 48 includes the method of example 42 or some other example herein, wherein the first PRB indexing includes numerology based on CC frequency.

Example 49 includes a method comprising: determining a physical resource block (PRB) indexing for a system bandwidth (BW) of a new radio (NR) carrier, wherein the PRB indexing is common to a plurality of user equipments (UEs); and generating a signal to transmit component carrier (CC) information to the plurality of UEs, the CC information to inform the plurality of UEs of the PRB indexing.

Example 50 includes the method of example 49 or some other example herein, wherein the signal is a resource control (RRC) signal.

Example 51 may include an apparatus comprising means to perform one or more elements of a method described in or related to any of examples 26-50, or any other method or process described herein.

Example 52 may include one or more non-transitory computer-readable media comprising instructions to cause an electronic device, upon execution of the instructions by one or more processors of the electronic device, to perform one or more elements of a method described in or related to any of examples 26-50, or any other method or process described herein.

Example 53 may include an apparatus comprising logic, modules, and/or circuitry to perform one or more elements of a method described in or related to any of examples 26-50, or any other method or process described herein.

Example 54 may include a method, technique, or process as described in or related to any of examples 26-50, or portions or parts thereof.

Example 55 may include an apparatus comprising: one or more processors and one or more computer-readable media comprising instructions that, when executed by the one or more processors, cause the one or more processors to perform the method, techniques, or process as described in or related to any of examples 26-50, or portions thereof.

Example 56 may include a method of communicating in a wireless network as shown and described herein.

Example 57 may include a system for providing wireless communication as shown and described herein.

Example 58 may include a device for providing wireless communication as shown and described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure.

What is claimed is:

1. A processor of a base station configured to perform operations comprising:
    determining a physical resource block (PRB) indexing for a system bandwidth (BW) of a new radio (NR) carrier for each of a plurality of user equipments (UEs), wherein a PRB index for an active bandwidth part specific to each UE of the plurality of UEs is defined for each respective UE, wherein the active bandwidth part is smaller than the system BW; and
    transmitting one or more signals to each of the plurality of UEs to inform each respective UE of the plurality of UEs indicating that the PRB indexing is for the active bandwidth part for the respective UE.

2. The processor of claim 1, wherein the PRB index for each respective UE is numerically indexed starting at zero.

3. The processor of claim 1, wherein the one or more signals indicate a starting point for the PRB index for the respective UE.

4. The processor of claim 1, wherein the one or more signals indicate a number of PRBs associated with the PRB indexing for each respective UE.

5. The processor of claim 1, wherein the one or more signals indicate a resource block group (RBG) size for resource allocation associated with the respective UE.

6. The processor of claim 1, wherein the one or more signals comprise downlink control information (DCI) indicating a type of PRB index to be utilized by the respective UE.

7. An apparatus of a base station configured to operate in a new radio (NR) network, comprising:
    radio frequency (RF) circuitry configured to communicate within the NR network; and
    one or more baseband processors communicatively coupled to the RF circuitry and configured to perform operations, comprising:
        determining a physical resource block (PRB) indexing for a system bandwidth (BW) of a new radio (NR) carrier for each of a plurality of user equipments (UEs), wherein a PRB index for an active bandwidth part specific to each UE of the plurality of UEs is defined for each respective UE; and
        transmitting one or more signals to each of the plurality of UEs to inform each respective UE of the plurality of UEs indicating that the PRB indexing is for the active bandwidth part for the respective UE.

8. The apparatus of claim 7, wherein each of the plurality of UEs is one of a narrowband (NB) UE, a carrier aggregation (CA) UE, and a wideband (WB) UE.

9. The apparatus of claim 7, wherein the PRB index for each respective UE is based on a 15-kilohertz (kHZ) subcarrier spacing for sub-6 gigahertz (GHz) carrier frequencies.

10. The base station of claim 7, wherein the one or more signals indicate a starting point for the PRB index for the respective UE.

11. The base station of claim 7, wherein the one or more signals indicate a number of PRBs associated with the PRB index for the respective UE.

12. The base station of claim 7, wherein the one or more signals indicate a resource block group (RBG) size for resource allocation associated with the respective UE.

13. The base station of claim 7, wherein the one or more signals comprise downlink control information (DCI) indicating a type of PRB index to be utilized by the respective UE.

* * * * *